Patented Dec. 2, 1941

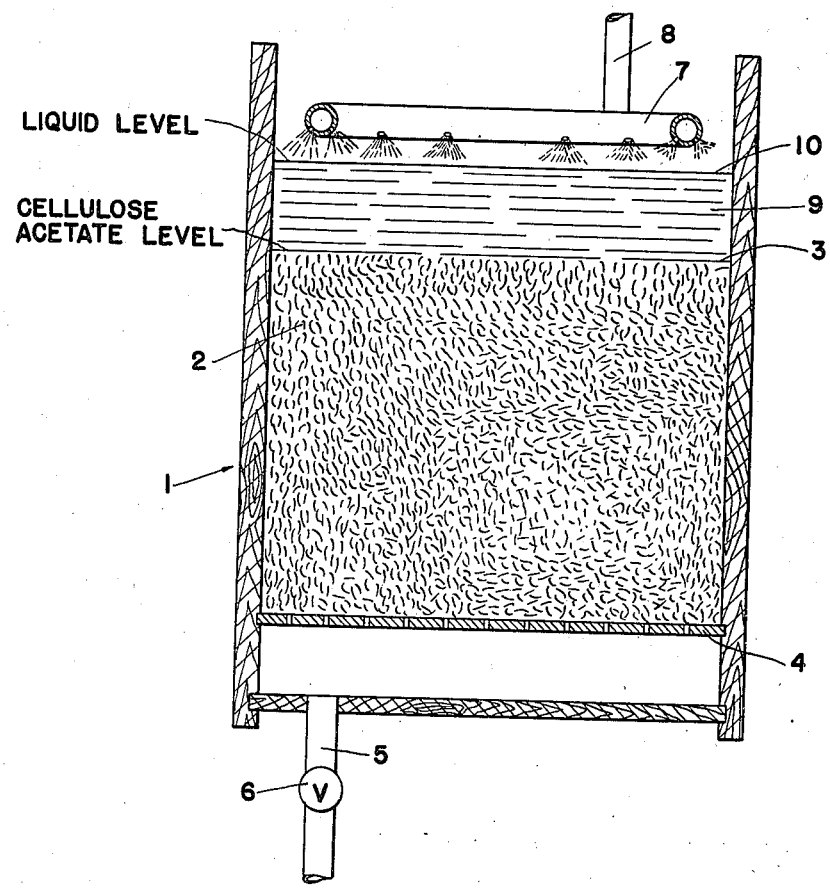

2,264,828

UNITED STATES PATENT OFFICE 2,264,828

WASHING PROCESS

Edward G. Crum, Parlin, N. J., assignor to Hercules Powder Company, Wilmington, Del., a corporation of Delaware Application June 14, 1940, Serial No. 340,560

10 Claims. (Cl. 260—230)

This invention relates to the purification of precipitated lower fatty acid esters of cellulose, such as cellulose acetate, to remove residual acid therefrom.

Precipitated cellulose lower fatty acid esters have heretofore been freed from residual acid by a batch process in accordance with which water was mixed with a mass of the precipitated ester, after which the liquid in the mass was drained off as completely as possible. This method is disadvantageous because of the inconvenience of batch washing, the number of washes required, the long time cycle required for carrying out the washing, the necessity for agitating, the large amount of washing liquid required to effect a given purification and the excessive dilution of the spent acid thereby entailing excessively high recovery costs.

An object of the present invention is to provide an improved process for the purification of cellulose lower fatty acid esters which overcomes the disadvantages of previous processes and brings about numerous advantages over such processes.

Another object is to provide for the more efficient use of the washing liquid in the purification of precipitated cellulose lower fatty acid esters.

Another object is to enable the recovery of the spent acids in as high a concentration as possible, thereby reducing the cost of concentrating the spent acid.

Another object is to reduce materially the amount of washing liquid required to effect a given degree of purification.

Other objects will more fully hereinafter appear.

In the accompanying drawing, the figure portrays diagrammatically one form of apparatus by means of which the present invention may be carried out.

In accordance with the present invention, the mass of precipitated cellulose ester containing spent or residual aqueous lower fatty acid is displacement washed with an aqueous solution of lower fatty acid of concentration less than that of the residual liquid in the mass, or with water.

The present invention is applicable generally to the purification of precipitated cellulose lower fatty acid esters containing acyl groups of 2 to 6 carbon atoms and may be applied either to the single esters, such as cellulose, acetate, cellulose propionate, cellulose butyrate, cellulose valerate, etc., or to the mixed esters such as cellulose acetate propionate, cellulose acetate butyrate, etc.

The precipitated mass of cellulose lower fatty acid ester may be obtained as follows: The cellulose is first acylated by a reaction mixture comprising a lower fatty acid anhydride, a catalyst such as sulfuric acid, and a solvent for the ester in which the ester goes into solution as it is formed. Examples of suitable solvents are ethylene chloride or lower fatty acids such as acetic acid, formic acid, etc.

When esterification is complete, there is present a solution of substantially the tri-ester. The solution may or may not be treated to hydrolyze the tri-ester back to a lower ester. If hydrolysis is to be effected, the solution of tri-ester is admixed with a small amount of water and allowed to stand until the cellulose tri-ester has been hydrolyzed to the desired acyl content. The amount of water added at this stage is in excess of that required to convert any remaining lower fatty acid anhydride to the corresponding acid, but is insufficient to precipitate the dissolved cellulose tri-ester.

Precipitation is next brought about by adding to the solution of the tri-ester or of the lower ester an excess of water accompanied by agitation. This causes precipitation of the cellulose ester in the form of a mass of amorphous particles of a size dependent upon the condition of precipitation. The mass of precipitated cellulose ester usually contains aqueous lower fatty acid in a concentration of from about 25% to about 35% by weight. This lower fatty acid is contaminated with small amounts of sulfuric acid where sulfuric acid was employed as the catalyst for the esterification. The present invention aims to effect the removal of the lower fatty acids and of any other acid such as this sulfuric acid.

In accordance with the present invention, the mass of precipitated cellulose acetate or other ester is subjected to a displacement washing with aqueous lower fatty acids of concentration lower than that of the residual lower fatty acids contained in the mass or with water. A preferred procedure comprises subjecting the mass of precipitated cellulose ester to a series of displacement washings, the first of which are with aqueous lower fatty acid of progressively diminishing concentration and the last of which are with pure water.

The displacement washing of the precipitated cellulose lower fatty acid ester may be accomplished by distributing weak lower fatty acid such as acetic acid or water over the surface of the mass of precipitated ester and withdrawing the liquid from the bottom of the containing vessel through a suitable strainer or false bottom. The withdrawal may be either under the influence of gravity or positively exerted suction. As the weak acid or water employed for displacement passes downwardly through the cellulose acetate or other ester, it becomes progressively enriched through the absorption of entrained acid, meanwhile displacing the stronger acid. The first washing and, in many cases, the first several washings displace the stronger acid in such concentration that it can be economically treated to recover the acid contained therein. The displacement washing consists of a continuous addition and withdrawal. Preferably, the level of the liquid is maintained substantially above the level of the cellulose ester mass and the rate of withdrawal is held substantially equal to the rate of addition of washing liquid so as to maintain this liquid level. However, the process may be so conducted that while the rate of withdrawal is substantially equal to the rate of addition, the cellulose ester is not covered with liquid.

Where an aqueous lower fatty acid is employed as the displacement washing liquid, it will usually comprise aqueous acetic acid. However, other aqueous lower fatty acids may be employed such as propionic, butyric, formic, valeric, etc.

Referring to the accompanying drawing, 1 designates a vessel in which there is disposed a bed 2 of precipitated cellulose acetate having the level 3. The vessel 1 is provided with the false bottom 4, below which connects the withdrawal line 5 provided with the valve 6.

Suspended above the level 3 of the bed 2 is a spray ring 7 which is supplied with washing liquid under pressure by means of the pipe 8. The supernatant layer of displacement washing liquid is designated as 9 and may be maintained at the level 10 by means of the spray ring 7. If desired, suction may be applied to the withdrawal pipe 5 or withdrawal may take place under gravity.

Example 1

A mass of 330 lbs. of relatively coarse freshly precipitated cellulose acetate containing about 200 gallons of spent acetic acid of about 28% concentration was displacement washed with 3–4% acetic acid in the manner illustrated in the drawing. This was accomplished by continuously flowing 150 gallons of the weak acetic acid over the top of the cellulose acetate mass as the strong acid was continuously withdrawn from the bottom of the vessel. After the 150 gallons of displacement washing acid had been added, withdrawal of acid from the bottom was continued until the mass was substantially free of liquid. The total withdrawal amounted to 350 gallons of an average strength of 20% acetic acid. The cellulose acetate was still wet with about 10–15% acetic acid although all free acid had been removed.

Example 2

A mass of 330 lbs. of fine precipitated cellulose acetate containing about 200 gallons of approximately 10% acetic acid was displacement washed with pure water in the same manner as in Example 1. 150 gallons of pure water were employed. The withdrawal amounted to 150 gallons of 8% acetic acid, 150 gallons of 4% acetic acid, and 30 gallons of acetic acid of an acidity of 1% or lower. The mass was allowed to completely drain, after which it was displacement washed with pure water until the product contained less than 0.5% acid.

From the foregoing, it will be seen that the present invention provides the advantages of a short-time cycle of washing, a minimum amount of equipment required, efficient removal of the spent acid in a relatively concentrated form so that recovery thereof may be economically carried out and a large saving in the amount of washing liquid required for removing the spent acid and effecting final purification of the precipitated cellulose acetate with a consequent simplification of the process and a material saving in operating cost. The present invention enables the production of cellulose lower fatty acid esters having a very low content of free acid and therefore a very high standard of purity without entailing the use of more than a fraction of the amount of washing liquid required in prior processes of washing precipitated cellulose lower fatty acid esters.

It is to be understood that the details and examples hereinbefore set forth are illustrative only and that the invention as broadly described and claimed is in no way limited thereby.

What I claim and desire to protect by Letters Patent is:

1. The process of treating a mass of precipitated lower fatty acid ester of cellulose containing residual aqueous lower fatty acid liquid which comprises continuously distributing a wash liquid selected from the group consisting of water and aqueous lower fatty acids in concentration less than that of said residual acid, over the top surface of a mass or bed of the said ester and continuously withdrawing liquid from the bottom of the mass, the rate of withdrawal being substantially equal to the rate of addition of liquid to maintain a substantially constant liquid level.

2. The process of preparing a lower fatty acid ester of cellulose which comprises esterifying cellulose with a lower fatty acid anhydride and an inorganic acidic esterification catalyst in a solvent for the cellulose ester to form a cellulose ester solution, adding water to the cellulose ester solution in an amount in excess of that required to convert the remaining fatty acid anhydride to acid but insufficient to precipitate the dissolved cellulose ester, hydrolyzing the cellulose ester until a water-insoluble ester of the desired acyl content is reached, adding an excess of water to form a mass of precipitated cellulose ester particles, continuously distributing a wash liquid selected from the group consisting of water and aqueous lower fatty acid of a concentration less than that of the acid in the said mass, over the top surface of the said mass, and continuously withdrawing liquid from the bottom of the mass, the rate of withdrawal being substantially equal to the rate of addition of liquid to maintain a substantially constant liquid level.

3. The process for the preparation of a lower fatty acid ester of cellulose which comprises esterifying cellulose with a lower fatty acid anhydride and an inorganic acidic esterification catalyst in a solvent for the cellulose ester to form a cellulose ester solution, precipitating cellulose ester from the resulting solution by the addition of an excess of water to form a mass of precipitated cellulose ester particles, continuously distributing a wash liquid selected from the group consisting of water and aqueous lower fatty acids of a concentration less than that of the acid in the said mass, over the top surface of the said mass, and continuously withdrawing liquid from the bottom of the mass, the rate of withdrawal being substantially equal to the rate of addition of liquid to maintain a substantially constant liquid level.

4. The process of treating a mass or bed of precipitated cellulose acetate containing aqueous acetic acid to remove said acid with minimum dilution which comprises continuously distributing a wash liquid selected from the group consisting of water and aqueous acetic acid of a concentration less than that of the acid in the said mass, over the top surface of the mass, and continuously withdrawing liquid from the bottom of the mass, the rate of withdrawal being substantially equal to the rate of addition of liquid to maintain a substantially constant liquid level.

5. The process of treating a mass or bed of precipitated lower fatty acid ester of cellulose containing residual aqueous lower fatty acid which comprises continuously distributing aqueous lower fatty acid of a concentration less than that of the acid in the said mass over the top surface of the mass, and continuously withdrawing liquid from the bottom of the mass, the rate of withdrawal being substantially equal to the rate of addition of liquid to maintain a substantially constant liquid level.

6. The process of treating a mass or bed of precipitated lower fatty acid ester of cellulose containing residual aqueous lower fatty acid which comprises continuously distributing water over the top surface of the mass, and continuously withdrawing liquid from the bottom of the mass, the rate of withdrawal being substantially equal to the rate of addition of liquid to maintain a substantially constant liquid level.

7. The process of treating a mass or bed of precipitated cellulose acetate containing aqueous acetic acid of from about 25% to about 35% concentration, which comprises continuously distributing aqueous acetic acid of from about 3% to about 4% concentration over the top surface of the mass, and continuously withdrawing liquid from the bottom of the mass, the rate of withdrawal being substantially equal to the rate of addition of liquid to maintain a substantially constant liquid level.

8. The process of treating a mass or bed of precipitated cellulose acetate containing about 0.6 gallon of aqueous acetic acid of about 28% concentration per pound of the cellulose acetate which comprises distributing aqueous acetic acid of from about 3% to about 4% concentration in an amount of about 0.45 gallon per pound of cellulose acetate in the mass over the top surface of the mass.

9. The process of treating a mass or bed of precipitated cellulose acetate containing aqueous acetic acid of about 10% concentration which comprises continuously distributing water over the top surface of the mass and continuously withdrawing liquid from the bottom of the mass, the rate of withdrawal being substantially equal to the rate of addition to maintain a substantially constant liquid level.

10. The process of treating a mass or bed of precipitated cellulose acetate containing about 0.6 gallon of aqueous acetic acid of about 10% concentration per pound of cellulose acetate in the mass which comprises distributing water in an amount of about 0.45 gallon per pound of the cellulose acetate in the mass over the top surface of the mass, allowing the mass to drain completely and further distributing water over the top surface of the mass continuously while continuously withdrawing the liquid from the bottom of the mass, the rate of withdrawal being substantially equal to the rate of addition of the liquid until the cellulose acetate in the mass contains less than 0.5% of acetic acid.

EDWARD G. CRUM.